US010277624B1

(12) United States Patent
Magar

(10) Patent No.: US 10,277,624 B1
(45) Date of Patent: Apr. 30, 2019

(54) SYSTEMS AND METHODS FOR REDUCING INFECTION RISK OF COMPUTING SYSTEMS

(71) Applicant: Symantec Corporation, Mountain View, CA (US)

(72) Inventor: Sujit Magar, Pune (IN)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 15/279,412

(22) Filed: Sep. 28, 2016

(51) Int. Cl.
*G06F 13/00* (2006.01)
*H04L 29/06* (2006.01)

(52) U.S. Cl.
CPC .................. *H04L 63/145* (2013.01)

(58) Field of Classification Search
CPC ... G06F 21/577; G06F 21/56; H04L 63/1441; H04L 63/1433; H04L 63/145; H04L 67/10; H04L 41/28; H04L 43/16; H04L 63/10
See application file for complete search history.

(56) References Cited

U.S. PATENT DOCUMENTS

| | | | | |
|---|---|---|---|---|
| 7,013,395 B1 * | 3/2006 | Swiler | ................. | H04L 63/1433 713/151 |
| 8,955,122 B2 * | 2/2015 | Gu | ........................ | G06F 21/552 370/238 |
| 9,043,922 B1 * | 5/2015 | Dumitras | .............. | G06F 21/577 726/25 |
| 9,197,711 B1 * | 11/2015 | Efstathopoulos | ....... | H04L 67/22 |
| 9,674,210 B1 * | 6/2017 | Oprea | ................. | H04L 63/1425 |
| 9,729,579 B1 * | 8/2017 | Marino | .................... | H04L 63/20 |
| 2008/0005555 A1 * | 1/2008 | Lotem | ..................... | G06F 21/55 713/150 |

(Continued)

FOREIGN PATENT DOCUMENTS

WO    WO 2015/195093 A1 * 12/2015

OTHER PUBLICATIONS

Laszka, Estimating Systematic Risk in Real-World Networks, 2014, Lecture Notes in Computer Science, vol. 8437, pp. 1-18.*

(Continued)

*Primary Examiner* — Farid Homayounmehr
*Assistant Examiner* — Lizbeth Torres-Diaz
(74) *Attorney, Agent, or Firm* — FisherBroyles, LLP

(57) ABSTRACT

The disclosed computer-implemented method for reducing infection risk of computing systems may include (i) determining a distance between a computing system that is connected to a local network and an additional computing system that is not connected to the local network but is connected to the computing system via a series of connected devices, (ii) detecting that the additional computing system is infected with malware, (iii) calculating an infection probability for the computing system that is based at least in part on the distance between the computing system and the additional computing system that is infected, and (iv) performing a security action on the computing system that reduces a risk of infection of the computing system in response to the infection probability for the computing system meeting a predetermined threshold for infection probability. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2012/0144492 A1* | 6/2012 | Griffin | ................... | G06F 21/56 |
| | | | | 726/25 |
| 2014/0101764 A1* | 4/2014 | Montoro | .............. | H04L 63/145 |
| | | | | 726/23 |
| 2014/0189861 A1* | 7/2014 | Gupta | ................... | H04L 63/08 |
| | | | | 726/22 |
| 2014/0283065 A1* | 9/2014 | Teddy | ................... | H04L 63/145 |
| | | | | 726/23 |
| 2015/0229664 A1* | 8/2015 | Hawthorn | ........... | H04L 63/1433 |
| | | | | 726/25 |
| 2016/0232353 A1* | 8/2016 | Gupta | ................... | G06F 21/566 |
| 2017/0070528 A1* | 3/2017 | Coskun | .............. | H04L 63/1425 |
| 2017/0323102 A1* | 11/2017 | Manadhata | ......... | H04L 61/1511 |
| 2018/0012134 A1* | 1/2018 | Shetye | ................... | G06N 7/005 |

OTHER PUBLICATIONS

Vasileios Karyotis et al; Malware Diffusion Models for Modern Complex Networks, 1st Edition, Theory and Applications; http://store.elsevier.com/Malware-Diffusion-Models-for-Modern-Complex-Networks/Vasileios-Karyotis-/isbn-9780128027141/; Feb. 2, 2016.

Aron Laszka et al.; Estimating Systematic Risk in Real-World Networks; https://www.ifca.ai/fc14/papers/fc14_submission_159.pdf; 2014.

* cited by examiner

SYSTEMS AND METHODS FOR REDUCING INFECTION RISK OF COMPUTING SYSTEMS

BACKGROUND

Viruses, Trojans, spyware, and other kinds of malware are a constant threat to any computing system that requires network connectivity. Many different types of security systems exist to combat these threats, ranging from browser plug-ins to virus scanners to firewalls. Countless new instances and permutations of malware are created every day, requiring security systems to be constantly updated. Despite all this, many pieces of malware still manage to infect computing systems and carry out a variety of malicious actions. Some varieties of malware may spread malicious files to other computing systems that are in some way connected to the infected device.

Security software vendors have designed various models to predict the spread of malware between devices. However, traditional systems for predicting the spread of malware between connected devices may not take into account all of the factors involved in the connections between devices. Traditional systems may also lack critical data about which computing systems with connections to at-risk devices are currently infected, especially if the infected and at-risk devices are on different networks and/or have different administrators. The instant disclosure, therefore, identifies and addresses a need for systems and methods for reducing infection risk of computing systems.

SUMMARY

As will be described in greater detail below, the instant disclosure describes various systems and methods for reducing infection risk of computing systems.

In one example, a computer-implemented method for reducing infection risk of computing systems may include (i) determining a distance between the computing system that is connected to a local network and an additional computing system that is not connected to the local network but is connected to the computing system via a series of connected devices, (ii) detecting that the additional computing system is infected with malware, (iii) calculating an infection probability for the computing system that represents a probability that the computing system will be infected with the malware and that is based at least in part on the distance between the computing system and the additional computing system that is infected, and (iv) performing a security action on the computing system that reduces a risk of infection of the computing system in response to the infection probability for the computing system meeting a predetermined threshold for infection probability.

In some examples, determining the distance may include determining a total number of devices in the series of connected devices. In some examples, determining the distance may include determining the total number of different series of connected devices between the computing system and the additional computing system. Additionally or alternatively, determining the distance may include (i) identifying a group of series of connected devices between the computing system and the additional computing system, (ii) identifying the shortest series of connected devices within the series of connected devices that includes the fewest total devices, and (iii) determining that the distance includes the total number of devices in the shortest series of connected devices. In some examples, determining the distance between the computing system and the additional computing system that is connected to the computing system via the series of connected devices may include determining that the computing system has sent packets to the additional computing system via the series of connected devices and/or received packets from the additional computing system via the series of connected devices.

In some examples, performing the security action may include selecting the security action from a set of security actions categorized by levels of infection probability. In one embodiment, both the computing system and the additional computing system may be configured with the same anti-malware application.

In one embodiment, determining the distance between the computing system and the additional computing system may include determining a distance between the computing system and each device within a group of devices that are not connected to the local network, and detecting that the additional computing system is infected may including detecting that a subset of devices within the devices are infected. In this embodiment, calculating the infection probability for the computing systems may include calculating the infection probability based on the distance between the computing system and each device within the subset of devices that are infected.

In one embodiment, a system for implementing the above-described method may include (i) a determination module, stored in memory, that determines a distance between a computing system that is connected to a local network and an additional computing system that is not connected to the local network but is connected to the computing system via a series of connected devices, (ii) a detection module, stored in memory, that detects that the additional computing system is infected with malware, (iii) a calculation module, stored in memory, that calculates an infection probability for the computing system that represents a probability that the computing system will be infected with the malware and that is based at least in part on the distance between the computing system and the additional computing system that is infected, (iv) a security module, stored in memory, that performs a security action on the computing system that reduces a risk of infection of the computing system in response to the infection probability for the computing system meeting a predetermined threshold for infection probability, and (v) at least one physical processor configured to execute the determination module, the detection module, the calculation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine a distance between a computing system that is connected to a local network and an additional computing system that is not connected to the local network but is connected to the computing system via a series of connected devices, (ii) detect that the additional computing system is infected with malware, (iii) calculate an infection probability for the computing system that represents a probability that the computing system will be infected with the malware and that is based at least in part on the distance between the computing system and the additional computing system that is infected, and (iv) perform a security action on the computing system that reduces a risk of infection of the computing system in response to the infection probability for the computing system meeting a predetermined threshold for infection probability.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
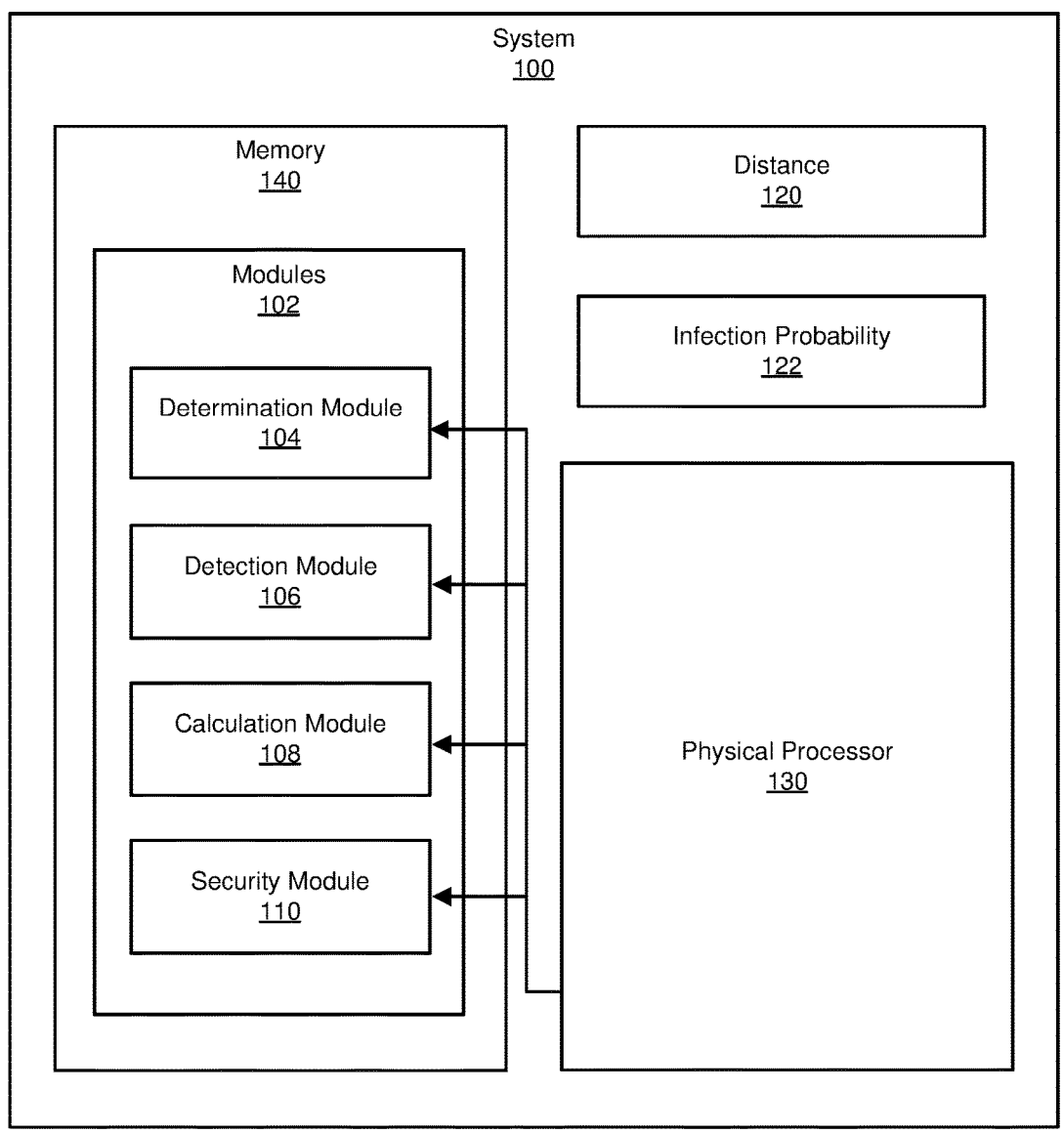
FIG. 1 is a block diagram of an example system for reducing infection risk of computing systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for reducing infection risk of computing systems. As will be explained in greater detail below, by calculating infection probabilities based on distances between computing systems, the systems and methods described herein may be able to predict malware infections accurately from a wide variety of potential infection vectors. By calculating infection probability in this way, the systems and methods described herein may be able to improve the security of a computing system when compared to a traditional system that may not take into account distance between devices when calculating infection probabilities and/or may not have access to infection information for a wide variety of devices spread across many networks. In addition, the systems and methods described herein may improve the functioning of a computing system by determining when the computing system would benefit from additional protection against potentially malicious files with increased accuracy, thus reducing the computing system's likelihood of infection.

The following will provide, with reference to FIGS. 1, 2, 4, and 5, detailed descriptions of example systems for reducing infection risk of computing systems. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of example system 100 for reducing infection risk of computing systems. As illustrated in this figure, example system 100 may include one or more modules 102 for performing one or more tasks. For example, and as will be explained in greater detail below, example system 100 may include a determination module 104 that determines a distance between a computing system that is connected to a local network and an additional computing system that is not connected to the local network but is connected to the computing system via a series of connected devices. Example system 100 may additionally include a detection module 106 that detects that the additional computing system is infected with malware. Example system 100 may also include a calculation module 108 that calculates an infection probability for the computing system that represents a probability that the computing system will be infected with the malware and that is based at least in part on the distance between the computing system and the additional computing system that is infected. Example system 100 may additionally include a security module 110 that performs a security action on the computing system that reduces a risk of infection of the computing system in response to the infection probability for the computing system meeting a predetermined threshold for infection probability. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing system 202 and/or additional computing system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate reducing infection risk of computing systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more calculated distances between computing systems, such as distance 120. Distance 120 generally represents any type or form of representation of the total number of devices, computing systems, and/or networks that relay information between two computing systems. Examples of distance 120 may include, without limitation, integers, fractions, decimals, ratios, percentages, lists of intervening devices, and/or text categories. Example system 100 may also include one or more calculated infection probabilities, such as infection probability 122. Infection probability 122 generally represents any type or form of representation of a calculation of the probability that one or more computing systems may spread a malware infection to one or more other computing systems. Examples of infection probability 122 may include, without limitation, a fraction, a percentage, a categorization, and/or an equation.

Figure 2:
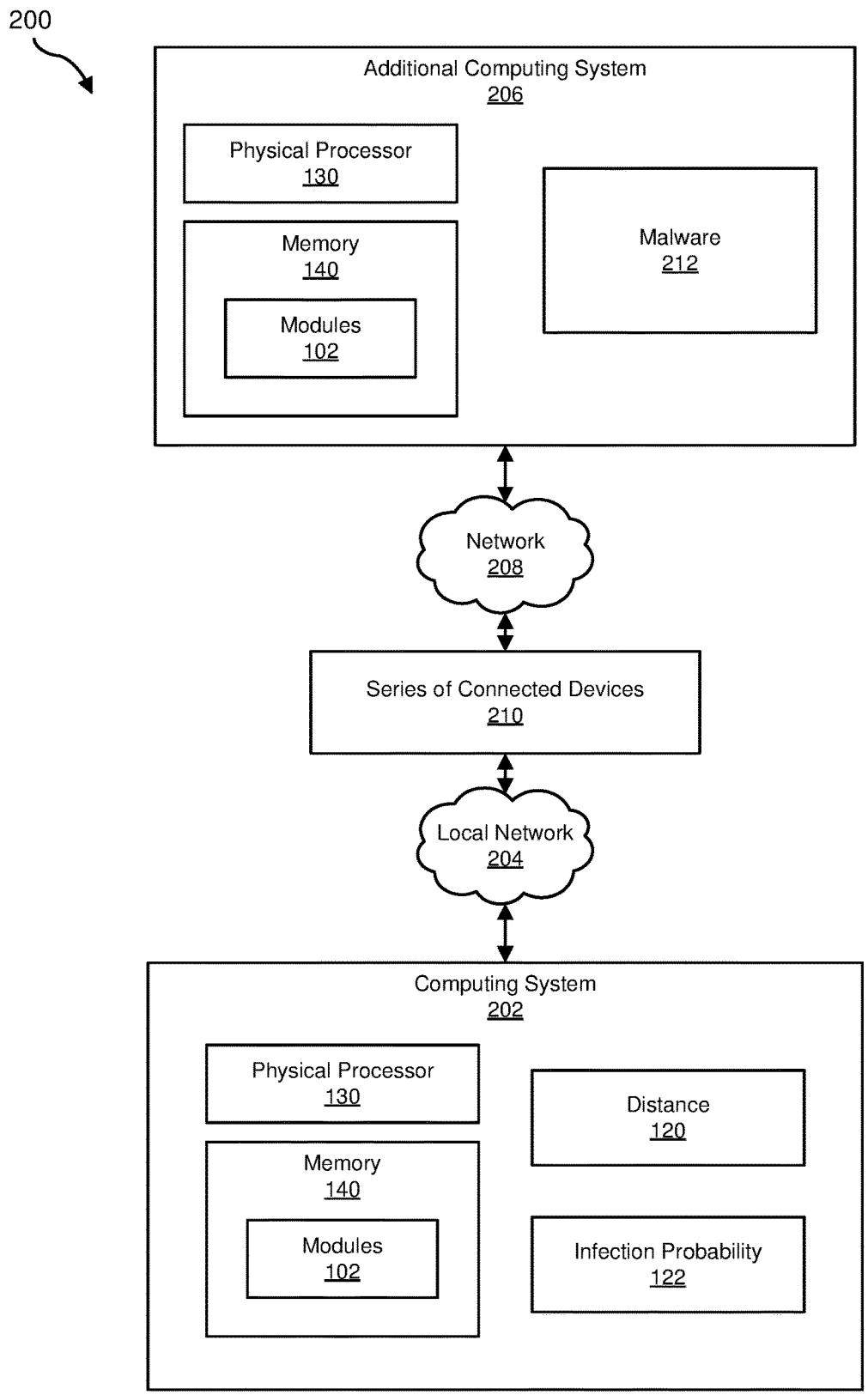
FIG. 2 is a block diagram of an additional example system for reducing infection risk of computing systems.

Example system 100 in FIG. 1 may be implemented in a variety of ways. For example, all or a portion of example system 100 may represent portions of example system 200 in FIG. 2. As shown in FIG. 2, system 200 may include a computing system 202 in communication with an additional computing system 206 via a local network 204, a series of connected devices 210, and/or a network 208. In one example, all or a portion of the functionality of modules 102 may be performed by computing system 202, additional computing system 206, and/or any other suitable computing system. As will be described in greater detail below, one or more of modules 102 from FIG. 1 may, when executed by at least one processor of computing system 202, enable computing system to reduce the infection risk of computing systems. For example, and as will be described in greater detail below, determination module 104 may determine distance 120 between computing system 202 that is connected to local network 204 and an additional computing system 206 that is not connected to the local network 204 but is connected to computing system 202 via series of connected devices 210. Either at some later time or before determination module 104 has determined distance 120, detection module 106 may detect that additional computing system 206 is infected with malware 212. Next, calculation module 108 may calculate an infection probability 122 for computing system 202 that represents a probability that computing system 202 will be infected with malware 212 and that is based at least in part on distance 120 between computing system 202 and additional computing system 206 that is infected. Security module 110 may perform a security action on computing system 202 that reduces a risk of infection of computing system 202 in response to infection probability 122 for computing system 202 meeting a predetermined threshold for infection probability.

Computing system 202 and/or additional computing system 206 generally represent any type or form of computing system capable of reading computer-executable instructions. In some embodiments, computing system 202 and/or additional computing system 206 may represent a personal computing system, such as a laptop or a desktop. In some embodiments, computing system 202 may include the computing device that performs the steps illustrated in method 300 in FIG. 3. In other embodiments, a computing device that is not computing system 202 may perform some or all of the steps illustrated in method 300 on and/or on behalf of computing system 202. Additional examples of computing system 202, additional computing system 206, and/or the computing device include, without limitation, tablets, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Series of connected devices 210 generally represents any group of one or more computing systems and/or devices that relay information via any type of connection. Devices in series of connected devices 210 may include, without limitation, any of the example devices discussed in connection with computing system 202 above, routers, network switches, and/or other gateway devices. There may be any number of devices in series of connected devices 210. In one example, there may only be one device in series of connected devices 210. In some embodiments, series of connected devices 210 may include computing system 202 and/or additional computing system 206. In other embodiments, series of connected devices 210 may include the devices between computing system 202 and additional computing system 206 but may exclude computing system 202 and/or additional computing system 206. In some examples, connections between devices in series of connected devices 210 may be session-based or temporary connections. For example, a personal computer that uploads a file to a file server may be considered connected to the file server. In another example, a personal computer that is used by a user to log in to a social network has a connection with the social network platform's server. In other examples, connections between devices in series of connected devices 210 may be less temporary, such as a network connection and/or a hardware connection. In some embodiments, a connection may be defined as a traceable communication link.

Local network 204 and/or network 208 generally represent any medium or architecture capable of facilitating communication or data transfer. In one example, local network 204 may facilitate communication between computing system 202 and series of connected devices 210. In some examples, local network 204 and/or network 208 may facilitate communication or data transfer using wireless and/or wired connections. Examples of local network 204 include, without limitation, any type or form of local area network (LAN). Examples of network 208 include, without limitation, an intranet, a Wide Area Network (WAN), a LAN, a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Malware 212 generally represents any type or form of malicious file, script, and/or application that may take unwanted actions on a computing system. Examples of malware 212 include, without limitation, spyware, Trojans, keyloggers, viruses, and/or adware.

Figure 3:
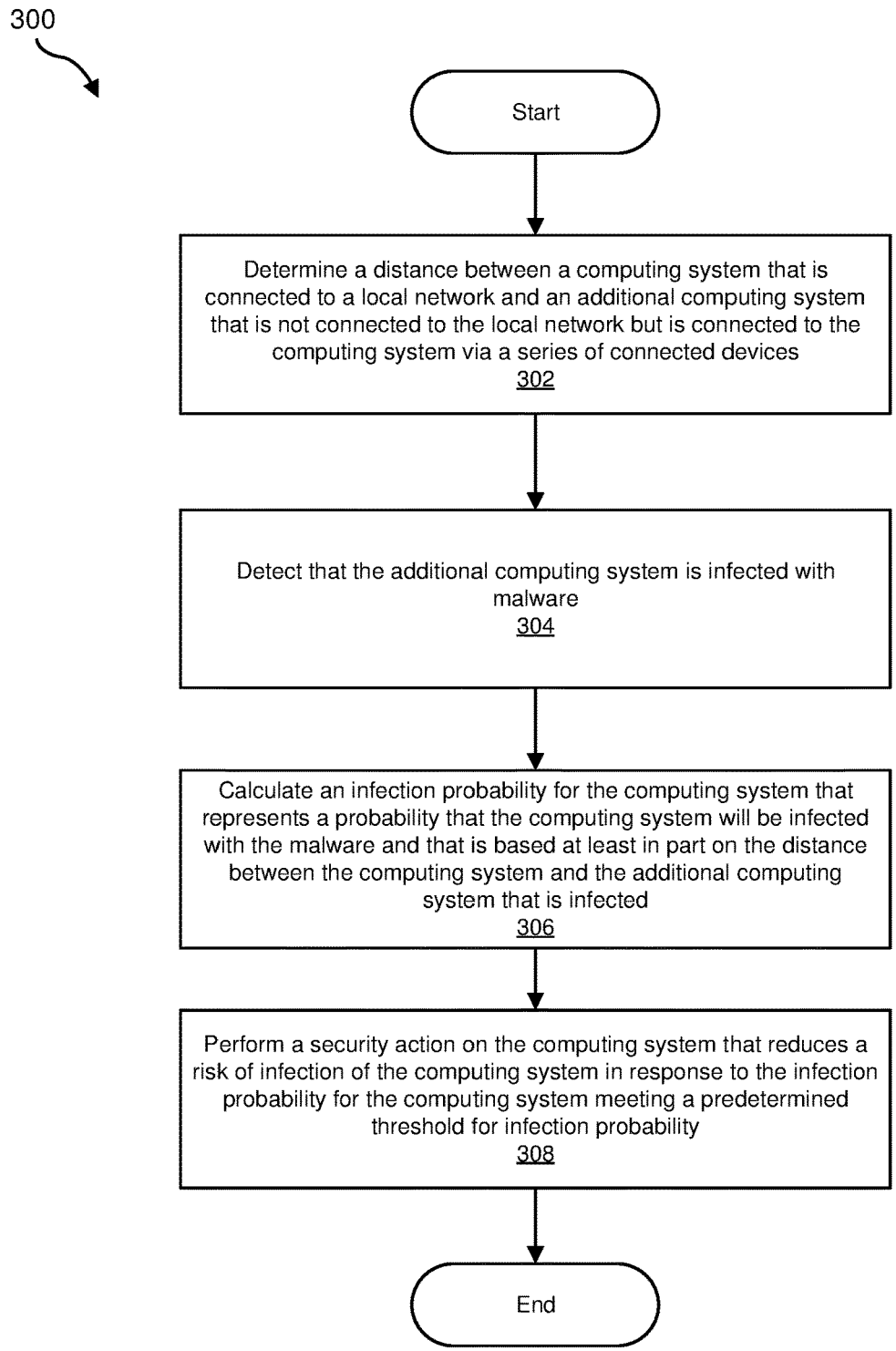
FIG. 3 is a flow diagram of an example method for reducing infection risk of computing systems.

FIG. 3 is a flow diagram of an example computer-implemented method 300 for reducing infection risk of computing systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may determine a distance between the computing system that is connected to a local network and an additional computing system that is not connected to the local network but is connected to the computing system via a series of connected devices. For example, determination module 104 may, as part of computing system 202 in FIG. 2, determine distance 120 between computing system 202 that is connected to local network 204 and additional computing system 206 that is not connected to local network 204 but is connected to computing system 202 via series of connected devices 210.

Determination module 104 may determine the distance between the computing system and the additional computing system in a variety of ways. For example, determination module 104 may track interactions between the computing system and some or all of the additional computing systems that the computing system forms connections with. In one embodiment, determination module 104 may communicate with other computing systems and/or servers to determine which additional computing systems connect to the other computing systems that the computing system has connections with, which computing systems connect to those computing systems, and so forth. In some embodiments, determination module 104 may have a predetermined threshold for connection length and may ignore computing systems that are more than a certain number of connections away from the computing system.

Determination module 104 may determine that a connection exists in a variety of ways. In some embodiments, determination module 104 may determine the distance between the computing system and the additional computing system that is connected to the computing system via the series of connected devices by determining that the computing system has sent packets to the additional computing system via the series of connected devices and/or received packets from the additional computing system via the series of connected devices. In one embodiment, determination module 104 may trace the route of the packets to determine information about the devices in the series of connected devices. In some embodiments, determination module 104 may determine the distance between the computing system and the additional computing system by counting the number of devices in a traceroute between the computing system and the additional computing system.

Figure 4:
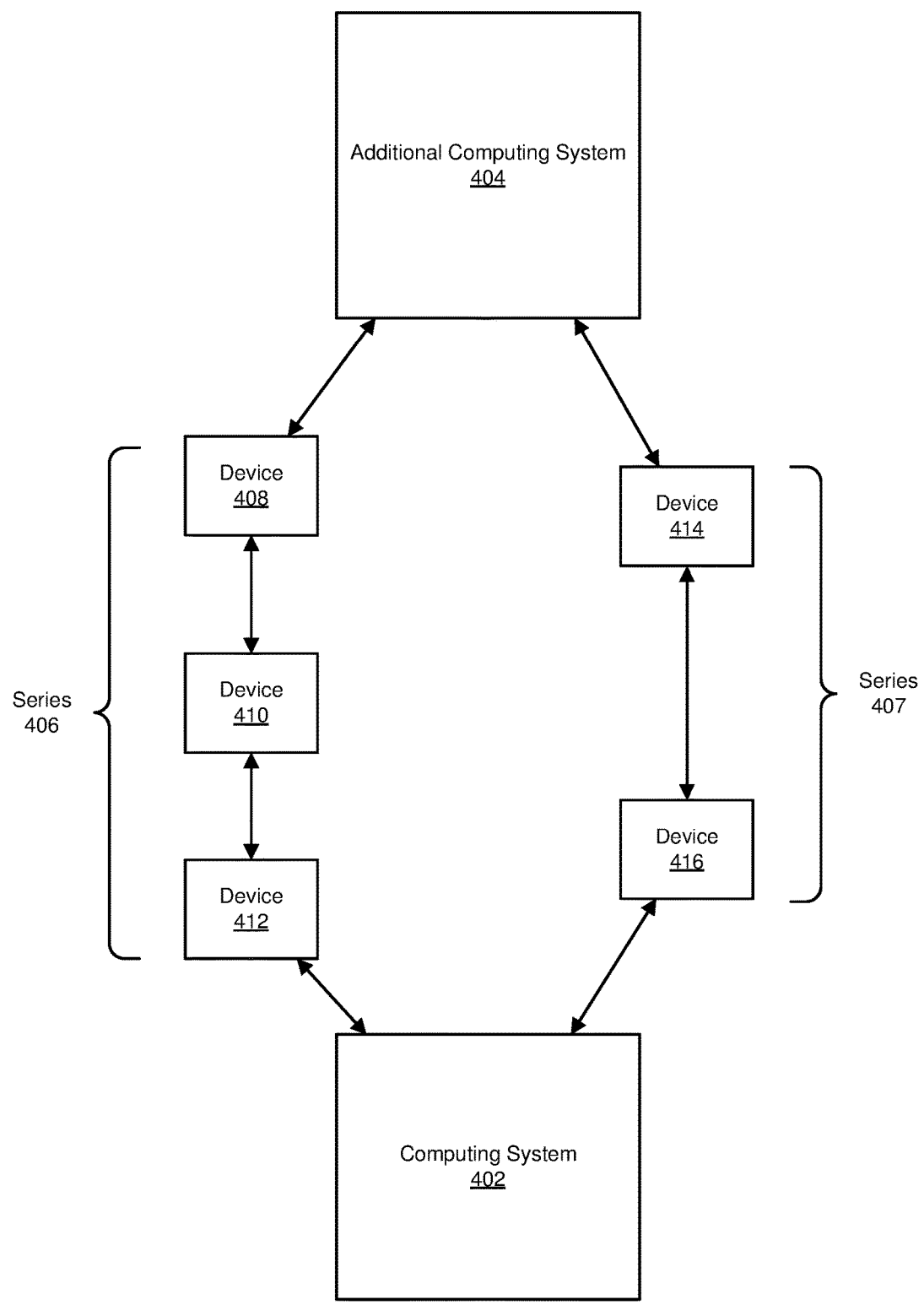
FIG. 4 is a block diagram of an example computing system for reducing infection risk of computing systems.

In some examples, determination module 104 may determine the distance by determining a total number of devices in the series of connected devices. Additionally or alternatively, determination module 104 may determine the distance by determining a total number of different series of connected devices between the computing system and the additional computing system. For example, as illustrated in FIG. 4, a computing system 402 may be connected to an additional computing system 404 via two different series of connected devices, series 406 and series 407. In this example, series 406 may include three devices, device 408, 410, and/or 412, while series 407 may include two devices, device 414 and/or 416. In some embodiments, determination module 104 may determine that computing system 402 and additional computing system 404 are more closely connected than if computing system 402 and additional computing system 404 were connected by only a single series of devices. In one embodiment, determination module 104 may measure this closeness by altering the distance metric. In another embodiment, determination module 104 may use a separate metric from distance to track the number of series of connected devices between two computing systems.

In some embodiments, determination module 104 may determine the distance by identifying a plurality of series of connected devices between the computing system and the additional computing system, identifying the shortest series of connected devices within the plurality of series of connected devices that includes the fewest total devices, and determining that the distance is the total number of devices in the shortest series of connected devices. For example, determination module 104 may determine that series 407 is the shortest series of connected devices between computing system 402 and additional computing system 404 and that the total distance between the two computing systems is two devices. In some examples, determination module 104 may have access to multiple instances of series of connect devices that connect the two computing systems. For example, determination module 104 may have collected a number of traceroutes showing different connections between the two computing systems. In this example, determination module 104 may calculate the number of devices listed in each traceroute and determine that the number of devices in the shortest traceroute is the distance between computing system 402 and additional computing system 404.

Returning to FIG. 3, at step 304, one or more of the systems described herein may detect that the additional computing system is infected with malware. For example, detection module 106 may, as part of computing system 202 in FIG. 2, detect that additional computing system 206 is infected with malware 212.

Detection module 106 may detect that the additional computing system is infected with malware in a variety of ways. In one embodiment, both the computing system and the additional computing system may be configured with the same anti-malware application. In this embodiment, detection module 106 may detect that the additional computing system is infected by detecting, via the anti-malware application, that the additional computing system is infected. In one embodiment, the anti-malware application on the infected device may send infection information to an anti-malware server that may send infection information to detection module 106 on the computing system. In another embodiment, the anti-malware application on the infected device may send infection information to an anti-malware server that may be configured with detection module 106. In this embodiment, the anti-malware server may also be configured with one or more additional modules from modules 102 and/or may use the infection information to calculate infection probabilities for one or more computing systems that are configured with the anti-malware software and/or connected to the infected device.

At step 306, one or more of the systems described herein may calculate an infection probability for the computing system that represents a probability that the computing system will be infected with the malware and that is based at least in part on the distance between the computing system and the additional computing system that is infected. For example, calculation module 108 may, as part of computing system 202 in FIG. 2, calculate infection probability 122 for computing system 202 that represents a probability that computing system 202 will be infected with malware 212 and that is based at least in part on distance 120 between computing system 202 and additional computing system 206 that is infected.

Calculation module 108 may calculate the infection probability in a variety of ways. In some examples, calculation module 108 may use any standard arithmetic function, non-standard function, and/or a combination of the standard functions to derive the infection probability from the distance.

In some embodiments, calculation module 108 may calculate the infection probability by first calculating a vicinity measurement that is based at least in part on the distance. For example, calculation module 108 may calculate the vicinity to be inversely proportional to the number of devices in the shortest series of devices between the computing system and the additional computing system (i.e., the higher the distance, the lower the vicinity). In another example, calculation module 108 may calculate the vicinity to be directly proportional to the number of unique parallel series of devices that connect the computing system and the additional computing system. In some embodiments, calculation module 108 may combine the aforementioned two methods of calculation and/or use a constant. For example, calculation module may calculate the vicinity of device A to device X by using the equation "$V_{ax}=Z*P_{ax}/H_{ax}$," where V represents the vicinity between A and X, Z represents a predetermined constant, $P_{ax}$ represents the distance between A and X, and $H_{ax}$ represents the number of unique series of devices connecting A and X. In some embodiments, calculation module 108 may calculate the infection probability to be the same as the vicinity. In other embodiments, calculation module 108 may calculate the infection probability based on the vicinity.

Figure 5:
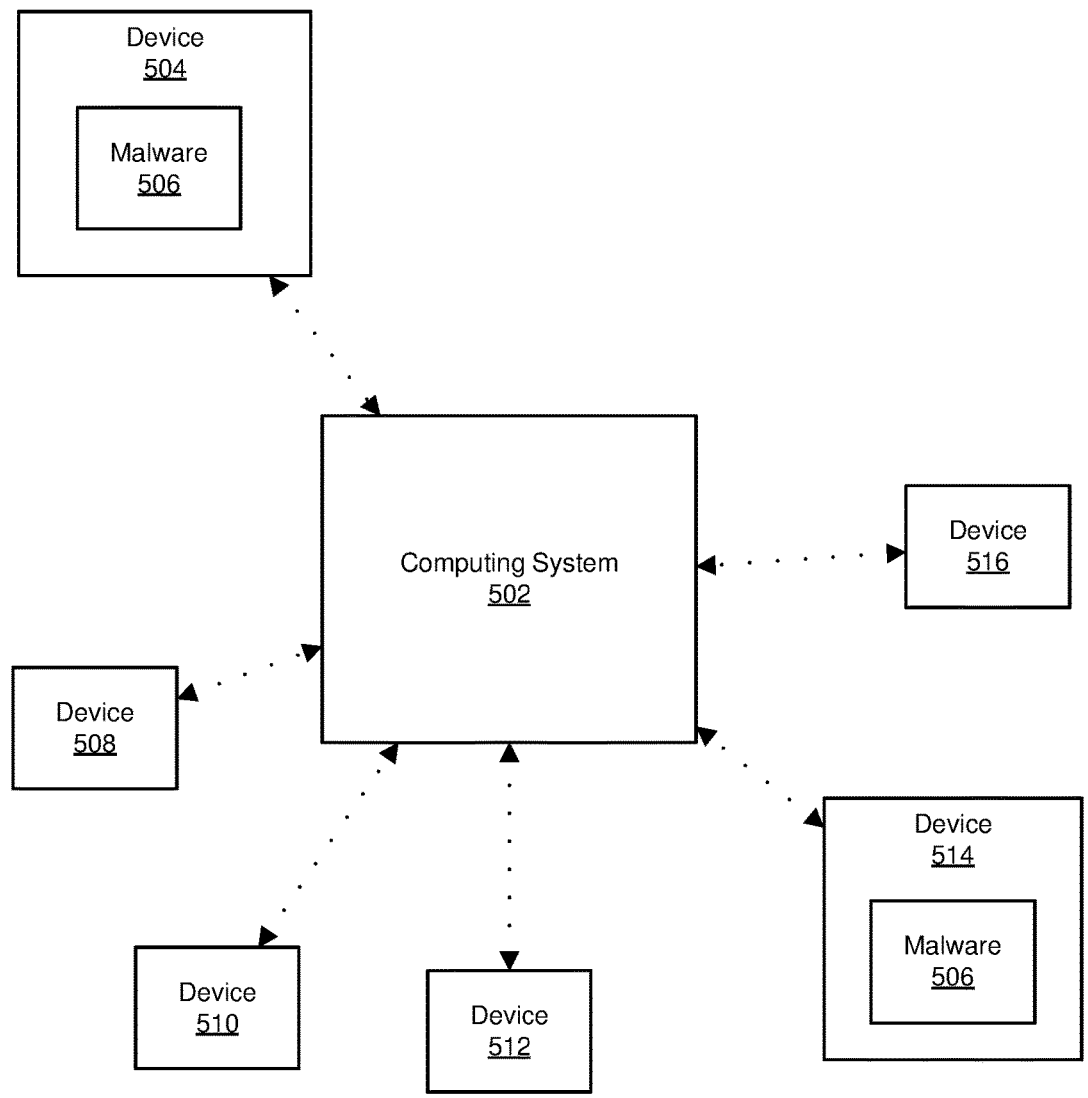
FIG. 5 is a block diagram of an additional example computing system for reducing infection risk of computing systems.

In one embodiment, determination module 104 may determine the distance between the computing system and the additional computing system by determining a distance between the computing system and each device within a group of devices that are not connected to the local network. In this embodiment, detection module 106 may detect that the additional computing system is infected by detecting that a subset of devices within the group of devices are infected and calculation module 108 may calculate the infection probability for the computing systems by calculating the infection probability based on the distance between the computing system and each device within the subset of devices that are infected. For example, as illustrated in FIG. 5, a computing system 502 may have connections to devices 504, 508, 510, 512, 514, and/or 516 that may be spread across different networks and/or owned by different administrators. In this example, determination module 104 may determine the distances between computing system 502 and each of devices 504, 508, 510, 512, 514, and/or 516. In some embodiments, computing system 502 and/or devices 504, 508, 510, 512, 514, and/or 516 may all be configured with the same anti-malware application.

In one example, detection module 106 may detect that device 504 and/or device 514 are infected with malware 506. In this example, calculation module 108 may calculate an infection probability for computing system 502 based on the distance between computing system 502 and device 504 and/or the distance between computing system 502 and device 514. For example, calculation module 108 may calculate the infection probability as the maximum of the probability that computing system 502 will be infected by device 514 and the probability that computing system 502 will be infected by device 504. In another embodiment, calculation module 108 may calculate the infection probability as the sum of the probability that computing system 502 will be infected by device 514 and the probability that computing system 502 will be infected by device 504. Additionally or alternatively, calculation module 108 may calculate the infection probability as the average of the probability that computing system 502 will be infected by device 514 and the probability that computing system 502 will be infected by device 504. In examples with a larger number of infected devices, calculation module 108 may similarly use a maximum, average, sum, and/or other equation involving the infection probabilities of each device relative to the computing system in order to calculate the total infection probability for the computing system.

Returning to FIG. 3, at step 308, one or more of the systems described herein may perform a security action on the computing system that reduces a risk of infection of the computing system in response to the infection probability for the computing system meeting a predetermined threshold for infection probability. For example, security module 110 may, as part of computing system 202 in FIG. 2, perform a security action on computing system 202 that reduces a risk of infection of computing system 202 in response to infection probability 122 for computing system 202 meeting a predetermined threshold for infection probability.

Security module 110 may perform a variety of security actions. For example, security module 110 may run a more intensive anti-malware scan than would normally be run on the computing system. In another example, security module 110 may reconfigure an anti-malware product to be stricter than previously configured. For example, security module 110 may switch an anti-malware product from a blacklist mode that only blocks known bad files to a whitelist mode that only allows known good files and/or a mode that blocks all files below a certain reputation, whether or not those files are on any list. In another example, security module 110 may reconfigure a firewall to block, monitor, and/or filter a larger portion of traffic than usual. In other examples, security module 110 may warn an administrator of the computing system about the infection probability. Additionally or alternatively, security module 110 may warn an administrator about and/or block connections with infected devices.

In some examples, security module 110 may perform the security action by selecting the security action from a set of security actions categorized by levels of infection probability. For example, security module 110 may warn a user about connections if the infection probability is categorized as medium but may automatically block connections if the infection probability is categorized as high.

As explained in connection with method 300 above, the systems and methods described herein may compute a risk of infection for the non-compromised computing systems using netflow data (i.e., connection and communication data) for the devices and knowledge of known compromised devices, not just on the same network or a particular topology, but across an entire user space. The probability of a computing system becoming attacked and/or infected increases greatly if one of the devices it is connected to is attacked and infected. However, since the traditional security systems do not measure the vicinity of non-compromised devices with that of compromised devices, traditional systems may not proactively identify the nodes at risk of getting attacked and/or infected. By determining which computing systems are most likely to be infected by other devices, even devices that are not part of the same network, the systems and methods described herein may enable administrators to efficiently deploy proactive security measures on the computing systems that most need such measures.

Figure 6:
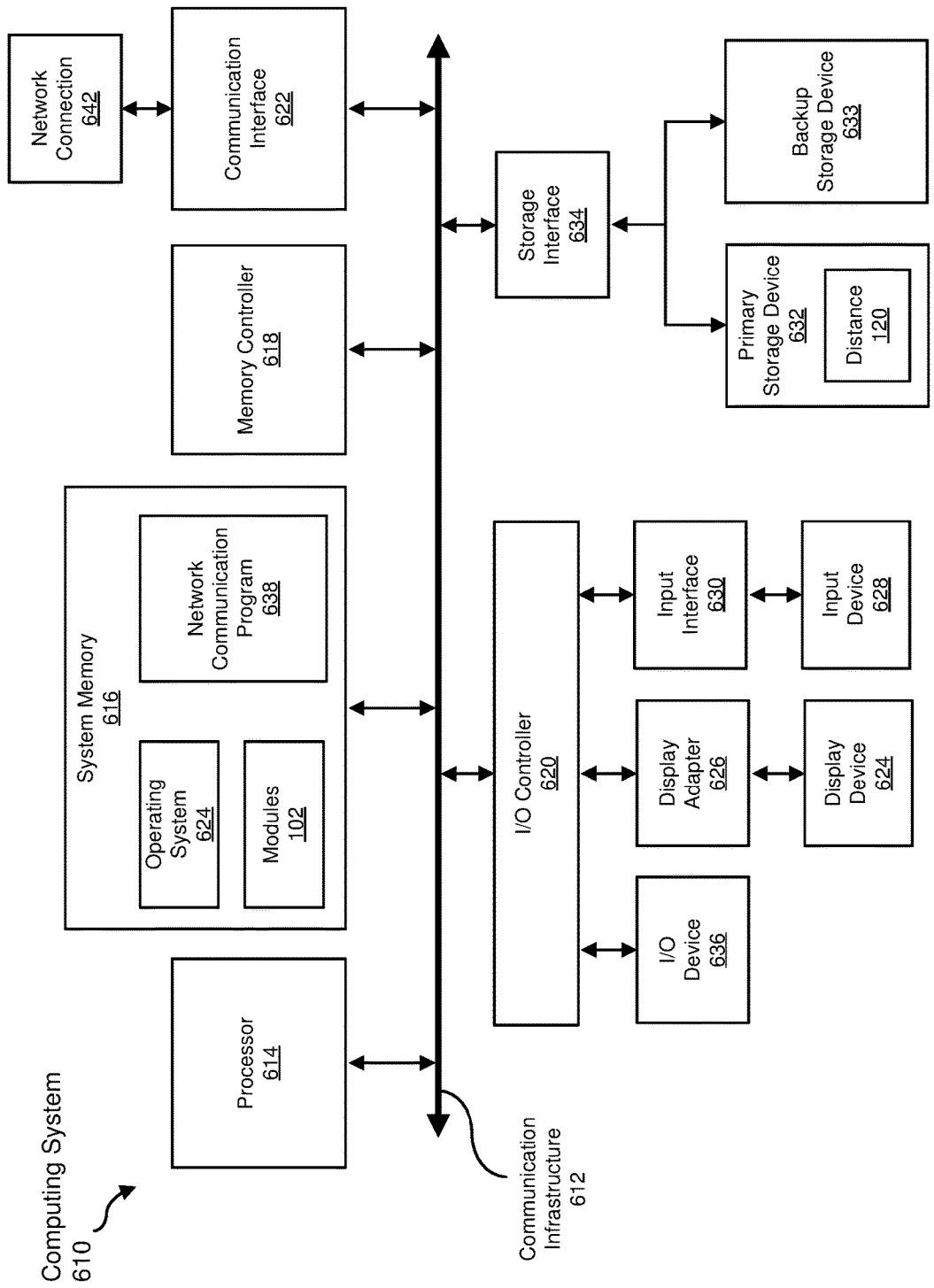
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing system or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing system. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing system. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, distance 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
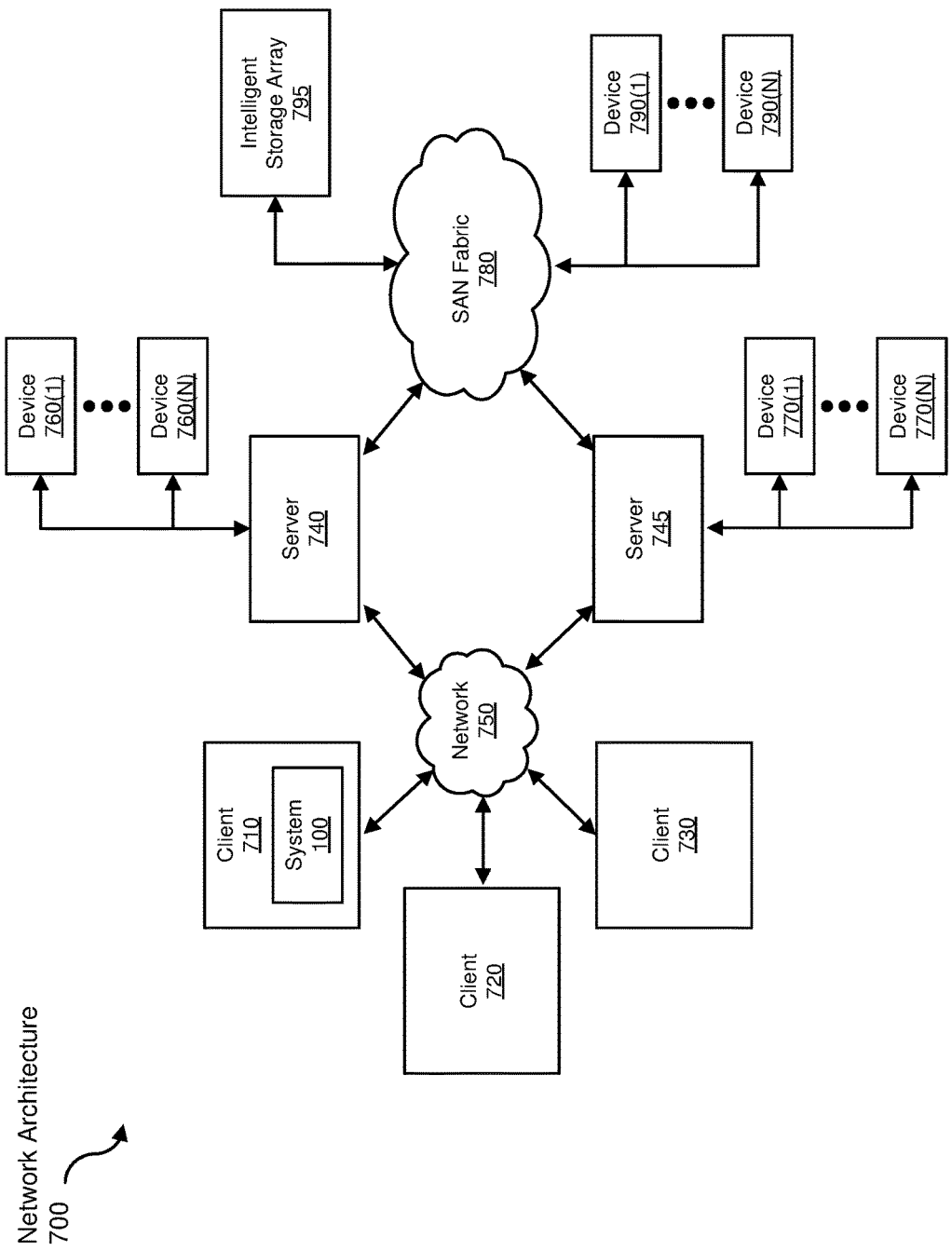
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing system or system, such as example computing system 610 in FIG. 6. Similarly, servers 740 and 745 generally represent computing systems or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for reducing infection risk of computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing systems, including mobile phones, tablet computers, e-book readers, personal digital assistants, wearable computing systems (e.g., computing systems with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing system connection data to be transformed, transform the computing system connection data into a topology and/or distance calculation, output a result of the transformation to a file and/or variable, use the result of the transformation to determine an infection probability, and store the result of the transformation to a file. Additionally or alternatively, one or more of the modules recited herein may transform a processor, volatile memory, non-volatile memory, and/or any other portion of a physical computing system from one form to another by executing on the computing system, storing data on the computing system, and/or otherwise interacting with the computing system.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reducing infection risk of computing systems, the method being performed by a computing device comprising at least one processor, the method comprising: determining, by a computing system connected to a local network, a distance between the computing system and an additional computing system that is not connected to the local network but is connected to the computing system via a series of connected devices; detecting, by the computing system, that the additional computing system is infected with malware; calculating, by the computing system, an infection probability for the computing system that represents a probability that the computing system will be infected with the malware by calculating a vicinity measurement that is based at least in part on the distance between the computing system and the additional computing system that is infected, wherein the vicinity measurement is calculated based on a combination of: (a) a vicinity that is inversely proportional to a total number of devices in a shortest series of connected devices, within the series of connected devices, that comprises a fewest total devices between the computing system and the additional computing system; and (b) a vicinity that is directly proportional to a parallel series of connected devices between the computing system and the additional computing system; and performing by the computing system, a security action that reduces a risk of infection of the computing system in response to the infection probability for the computing system meeting a predetermined threshold for infection probability, wherein the security action comprises blocking, by the computing system, one or more computing system connections to the additional computing system when the predetermined threshold for infection probability is met for a given risk category.

2. The computer-implemented method of claim 1, wherein determining the distance comprises determining a total number of devices in the series of connected devices.

3. The computer-implemented method of claim 1, wherein determining the distance comprises determining a total number of different series of connected devices between the computing system and the additional computing system.

4. The computer-implemented method of claim 1, wherein determining the distance comprises:
   identifying a plurality of series of connected devices between the computing system and the additional computing system;
   identifying a shortest series of connected devices within the plurality of series of connected devices that comprises a fewest total devices; and
   determining that the distance comprises a total number of devices in the shortest series of connected devices.

5. The computer-implemented method of claim 1, wherein performing the security action comprises selecting the security action from a set of security actions categorized by levels of infection probability.

6. The computer-implemented method of claim 1, wherein:
   determining the distance between the computing system and the additional computing system comprises determining a distance between the computing system and each device within a plurality of devices that are not connected to the local network;
   detecting that the additional computing system is infected comprises detecting that a subset of devices within the plurality of devices are infected; and
   calculating the infection probability for the computing system further comprises calculating the infection probability based on the distance between the computing system and each device within the subset of devices that are infected.

7. The computer-implemented method of claim 1, wherein both the computing system and the additional computing system are configured with a same anti-malware application.

8. The computer-implemented method of claim 1, wherein determining the distance between the computing system and the additional computing system that is connected to the computing system via the series of connected devices comprises determining that the computing system has performed at least one of:
   sending packets to the additional computing system via the series of connected devices; and
   receiving packets from the additional computing system via the series of connected devices.

9. A system for reducing infection risk of computing systems, the system comprising:
   a determination module, stored in memory, that determines, by a computing system connected to a local area network, a distance between the computing system and an additional computing system that is not connected to the local area network but is connected to the computing system via a series of connected devices;
   a detection module, stored in memory, that detects, by the computing system, that the additional computing system is infected with malware;
   a calculation module, stored in memory, that calculates, by the computing system, an infection probability for the computing system that represents a probability that the computing system will be infected with the malware by calculating a vicinity measurement that is based at least in part on the distance between the computing system and the additional computing system that is infected, wherein the vicinity measurement is calculated based on a combination of:
   (a) a vicinity that is inversely proportional to a total number of devices in a shortest series of connected devices, within the series of connected devices, that comprises a fewest total devices between the computing system and the additional computing system; and
   (b) a vicinity that is directly proportional to a parallel series of connected devices between the computing system and the additional computing system;
   a security module, stored in memory, that performs, by the computing system, a security action on the computing system in response to the infection probability for the computing system meeting a predetermined threshold for infection probability, wherein the security action comprises blocking, by the computing system, one or more computing system connections to the additional computing system when the predetermined threshold for infection probability is met for a given risk category; and
   at least one physical processor configured to execute the determination module, the detection module, the calculation module, and the security module.

10. The system of claim 9, wherein the determination module determines the distance by determining a total number of devices in the series of connected devices.

11. The system of claim 9, wherein the determination module determines the distance by determining a total number of different series of connected devices between the computing system and the additional computing system.

12. The system of claim 9, wherein the determination module determines the distance by:
   identifying a plurality of series of connected devices between the computing system and the additional computing system;
   identifying a shortest series of connected devices within the plurality of series of connected devices that comprises a fewest total devices; and
   determining that the distance comprises a total number of devices in the shortest series of connected devices.

13. The system of claim 9, wherein the security module performs the security action by selecting the security action from a set of security actions categorized by levels of infection probability.

14. The system of claim 9, wherein:
   the determination module determines the distance between the computing system and the additional computing system by determining a distance between the computing system and each device within a plurality of devices that are not connected to the local network;
   the detection module detects that the additional computing system is infected by detecting that a subset of devices within the plurality of devices are infected; and
   the calculation module further calculates the infection probability for the computing systems by calculating the infection probability based on the distance between the computing system and each device within the subset of devices that are infected.

15. The system of claim 9, wherein both the computing system and the additional computing system are configured with a same anti-malware application.

16. The system of claim 9, wherein the determination module determines the distance between the computing system and the additional computing system that is connected to the computing system via the series of connected devices by determining that the computing system has performed at least one of:

sending packets to the additional computing system via the series of connected devices; and receiving packets from the additional computing system via the series of connected devices.

17. A non-transitory computer-readable medium comprising one or more computer-readable instructions that, when executed by at least one processor of a computing device, cause the computing device to:

determine, by the computing device, a distance between a computing system that is connected to a local network and an additional computing system that is not connected to the local network but is connected to the computing system via a series of connected devices;

detect, by the computing device, that the additional computing system is infected with malware;

calculate, by the computing device, an infection probability for the computing system that represents a probability that the computing system will be infected with the malware by calculating a vicinity measurement that is based at least in part on the distance between the computing system and the additional computing system that is infected, wherein the vicinity measurement is calculated based on a combination of:

(a) a vicinity that is inversely proportional to a total number of devices in a shortest series of connected devices, within the series of connected devices, that comprises a fewest total devices between the computing system and the additional computing system; and (b) a vicinity that is directly proportional to a parallel series of connected devices between the computing system and the additional computing system; and perform, by the computing device, a security action on the computing system that reduces a risk of infection of the computing system in response to the infection probability for the computing system meeting a predetermined threshold for infection probability, wherein the security action comprises blocking, by the computing system, one or more computing system connections to the additional computing system when the predetermined threshold for infection probability is met for a given risk category.

18. The non-transitory computer-readable medium of claim 17, wherein the one or more computer-readable instructions cause the computing device to determine the distance by determining a total number of devices in the series of connected devices.

19. The non-transitory computer-readable medium of claim 17, wherein the one or more computer-readable instructions cause the computing device to determine the distance by determining a total number of different series of connected devices between the computing system and the additional computing system.

20. The non-transitory computer-readable medium of claim 17, wherein the one or more computer-readable instructions cause the computing device to determine the distance by:

identifying a plurality of series of connected devices between the computing system and the additional computing system;

identifying a shortest series of connected devices within the plurality of series of connected devices that comprises a fewest total devices; and determining that the distance comprises a total number of devices in the shortest series of connected devices.

* * * * *